INVENTOR.
George F. Ritter, Jr.
BY Nobbe & Collins
ATTORNEYS

United States Patent Office 3,527,589
Patented Sept. 8, 1970

3,527,589
SHEET SHAPING AND CONVEYING APPARATUS
George F. Ritter, Jr., Toledo, Ohio, assignor to Libbey-Owens-Ford Glass Company, Toledo, Ohio, a corporation of Ohio
Filed Feb. 13, 1967, Ser. No. 615,803
Int. Cl. C03b 23/02
U.S. Cl. 65—289
3 Claims

ABSTRACT OF THE DISCLOSURE

Sheet supporting and conveying apparatus comprising a plurality of conveyor rolls, each including an inner driven shaft and an outer load supporting sleeve rotatable on said shaft and coupled thereto by a torsion spring so that when the supporting sleeve is stopped the inner shaft can continue to rotate, thereby allowing a sheet to be removed from the conveyor roll without surface damage due to relative movement between it and the roll.

---

The present invention relates generally to sheet supporting and conveying apparatus and more particularly to improved conveyor apparatus for transferring and supporting glass sheets while they are in a heat-softened condition.

While this invention has proved particularly valuable in conveying and supporting heated glass sheets within a bending apparatus, and will be so described herein by way of example, it can be of utility in any situation in which articles being carried upon a continuously moving conveyor must be slowed down or stopped. When the conveyed motion of an article, such as a heated glass sheet, has been interrupted, however, further movement of the conveyor relative to the heat-softened surface of the sheet has been found to cause objectionable marring thereof.

For example, in producing curved or bent glass sheets in large quanties, such as is encountered in the commercial production of glazing closures for automobiles or the like, it is common practice to transfer the glass sheets successively through a heating area, a bending area and an annealing or tempering area in a substantially continuous manner by means of externally driven roll-type conveyors.

In the bending area, it is customary to locate each glass sheet in bending position by causing its leading edge to be carried against positive stops, which hold the sheet in the desired location with respect to complemental bending mold members. The sheets are then bent by being lifted from the rolls and pressed between the mold members. Since the glass must be in a heat-softened condition while it is within the bending area, its surfaces are very susceptible to marring and any relative movement between the glass and the conveyor rolls will tend to mark the glass and destroy the high optical quality required. Such relative movement is most likely to occur when the glass sheet continues to remain in contact with the rotating conveyor rolls after its own forward movement has been stopped. This condition can be avoided through precise timing between the stopping mechanism and that which lifts the glass sheet from the conveyor rolls, but it is extremely difficult to maintain this exact timing throughout a production run, due to wear and other variables which affect the adjustments.

It is therefore an important object of this invention to provide an improved conveyor roll including an inner driven member and an outer glass sheet supporting member, with resilient coupling means connecting the outer supporting member to the inner driven member to permit the sheet, while being carried by the supporting member of the conveyor roll to be halted while the inner driven member continues to rotate.

Another object of the invention is to provide a conveyor roll of the above character in which the torsional influence of the coupling means tends to reduce surface-to-surface frictional movement between the outer supporting member and a glass sheet halted thereupon by absorbing the energy imparted by the actively rotated inner member, and thereby permitting said support member to discontinue rotary movement.

Other objects and advantages of the invention will become more apparent during the course of the following description when taken in connection with the accompanying drawings.

In the drawings wherein like numerals are employed to designate like parts throughout the same:

Referring now more particularly to the drawings, the novel features of the present invention have been depicted as incorporated in a type of glass bending apparatus used in "press bending" glass sheets or plates.

Figure 1:
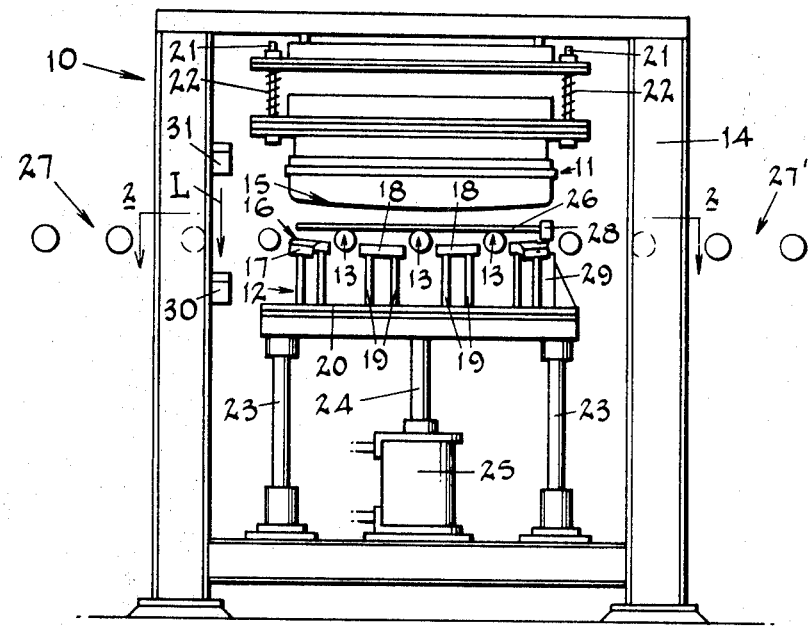
FIG. 1 is a side elevation of a typical horizontal press bending apparatus showing a glass sheet to be bent supported on conveyor rolls incorporating the present invention.
Figure 2:
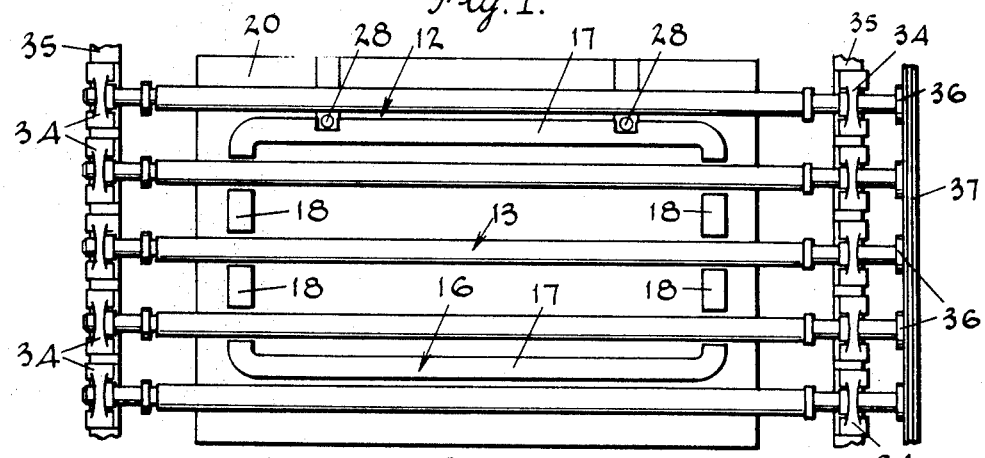
FIG. 2 is a view taken substantially along the line 2—2 in FIG. 1 and showing the special conveyor rolls in relationship to the lower mold member.
Figure 3:
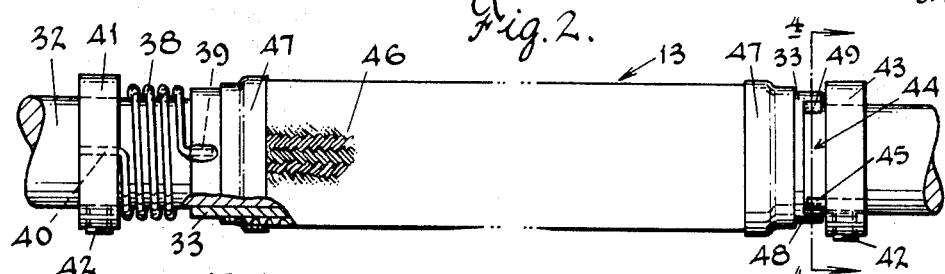
FIG. 3 is an enlarged detail view of one of the conveyor rolls.

Thus, in FIGS. 1 and 2 there is shown a typical press bending apparatus 10 consisting mainly of a substantially stationary upper male mold member 11, a movable lower female mold member 12, and a series of supporting conveyor rolls 13, all suitably mounted within a rigid framework 14. The shaping element 15 of the upper mold member 11 is generally a continuous surface, while the complemental shaping element 16 of the lower mold member 12 is of ring-type outline which engages only the marginal edge portions of the glass sheets. In order to provide clearance for the conveyor rolls and to permit the lower mold member 12 to move vertically into and out of pressing relation with the upper mold member 11, the ring-type shaping element 16 is formed with transversely disposed end portions 17 and longitudinally disposed spaced bar portions or segments 18 on pillars 19 fixed to a base section 20. The upper mold member 11 is supported on the framework 14 by bolts 21 and resiliently spaced therefrom by coil springs 22 surrounding the bolts and acting to absorb or cushion excessive pressure that would otherwise be exerted on the glass sheet by the pressing action of the lower mold member 12.

The lower mold member 12 is supported by guide members 23 which allow vertical movement thereof only, said vertical movement being provided by the ram 24 of a pressure-actuated cylinder 25 which bears against the base of the lower mold member.

Heat softened glass sheets 26 are advanced into the bending apparatus by a roll-type conveyor 27 and received in position to be bent on the rolls 13. When suitably located between the mold members, each sheet is halted upon engagement of its leading edge with stops 28 which are moved by pressure actuated cylinders 29 into and out of the sheet path. A photoelectric cell 30 senses the entry of the glass sheets into the bending apparatus, as the sheets interrupt the beam L from a light source 31, and initiates the bending cycle by actuating timing mechanisms which control the action of press cylinder 25 and stop cylinders 29.

In actual practice, the conveyor rolls 13 are continuously rotated and it is believed understandable that when the leading edge of a sheet 26 engages the locator stops 28 there will be a lapse of time before the lower mold member 12 is elevated by the ram 24 to lift the glass sheet from the surfaces of the rolls. While the bending operation is carefully monitored, this time lapse, although extremely short such as two-tenths of a second by way of example, has been found sufficient for the revolving surfaces of the rolls to cause distortion or marring of the heat-softened surface of the sheet that has become stationary against the locator stops. To alleviate this objectionable condition, it is herein proposed to form each of the rolls 13 with an outer sheet supporting sleeve and an inner positively driven shaft. By providing a resilient coupling between the sleeve and the shaft, the outer sleeve can be positively driven while permitting a degree of relative rotation between the sleeve and shaft to the end that during the aforementioned interval of time the sleeve is actually halted while the shaft continues to rotate.

In the illustrated embodiment of the invention, each conveyor roll 13 comprises an inner driven shaft 32 and an outer load carrying sleeve 33 which are in sliding contact with one another to allow relative rotation therebetween.

In mounting the rolls, the opposite ends of the shafts 32 extend beyond the sleeve 33 and are journaled in bearings 34 which are carried on rails 35 along opposite sides of the bending apparatus 10. At one end, the shaft 32 extends through the related bearing and is provided with a sprocket 36 engaged by drive means 37 which is capable of driving the complete set of rolls within the bending apparatus as shown in FIG. 2.

The inner shaft 32 and outer sleeve 33 are connected by an encircling resilient element such as a coiled torsion spring 38 which is fixed to one end of the sleeve 33 by means of a tang 39 which engages a slot or hole in the sleeve or can be attached thereto as by soldering or welding. The opposite end of the spring 38 is attached by a similar tang arrangement 40 to a collar 41 which is secured to the shaft 32 by means of a set-screw 42 which bears against said shaft. The collar 41 serves both as a means to connect the spring 38 to the shaft and, in conjunction with the spring 38 and a similar fixed collar 43 at the opposite end of the roll to position the sleeve 33 longitudinally with respect to the shaft 32. A sector of the end of the sleeve 33, opposite the spring 38, is cut away as at 44 as shown in section in FIG. 4; the ends of the cut-away sector 44 being adapted to be engaged by a pin 45 which is fixed to the collar 43 and extends from the side of the collar toward the cut-away portion 44 of the sleeve.

The sleeve 33 is covered with an asbestos or fibre glass material 46 to provide a resilient, heat-resistant, non-marring surface upon which the glass sheets are received. The covering is secured by stretching it over the sleeve and fastening the ends thereto with pressure sensitive tape 47 or in some other suitable manner.

The torque characteristics of the spring 38 are so selected that its torsional resistance is less than the friction torque between the sleeve 33 and a sheet of glass when the glass sheet is restrained by the locator stops 28, but has sufficient resistance to drive an unrestrained sheet with minimum deflection. During normal rotation of the shaft 32 and the sleeve 33 as produced by the flexible coupling or spring 38, the unrestrained rotation of the sleeve transmits the force of the spring therealong to maintain the end 48 of the open sector 44 in bearing contact with the pin 45 of the fixed collar 43.

The amount of relative rotation between the shaft 32 and the sleeve 33 is limited by the size of the cut-away sector 44 of said sleeve. While it is the aim of this invention to provide relative rotation within the conveyor roll itself, the duration of such relative rotation must be limited due to the tendency for the heat-softened glass sheet to sag between the rolls if caused to remain stationary thereon, which could result in undesirable distortion of the sheet.

Figure 4:
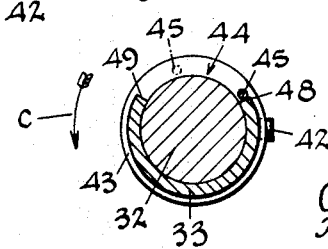
FIG. 4 is a cross sectional view of the roll of FIG. 3 taken along the line 4—4 in that figure.

Normal rotation of the rolls is in the direction of the arrow designated C in FIG. 4, with the spring 38 communicating the driven rotation of the shaft 32 to the sleeve 33. When each of the conveyor rolls is in an unloaded condition, the pin 45 is located adjacent the end 48 of the cut-away sector 44 in the end of the sleeve. When a glass sheet is moved onto the conveyor rolls 13, and the rolls are placed in a loaded condition, engagement of the leading edge of the sheet with the locator stops 28 will cause the sleeve 33 of each roll to stop its rotation relative to the shaft 32. Since the spring connects the sleeve 33 to the shaft 32, this loss of sleeve rotation will be absorbed in the spring coils. During this interval of operation when the shaft 32 is driven to rotate relative to the sleeve 33, the pin 45 is carried from the end 48 of the cut-away sector 43 in the end of the sleeve toward the opposite end 49.

In operation, heat-softened sheets of glass 26 are transferred by the rolls 27 from a heating area into the bending apparatus 10 where they come to rest against the locator stops 28 as previously described. At this point, there is provided a short interval of time during which the glass can be lifted off the rolls 13 by the lower mold member 12 before the occurrence of objectionable rotary movement of the sleeve against the surface of the sheet. It has been determined that with the use of 1.00 inch diameter rolls rotated at a speed of 100 r.p.m. movement of pin 45 from the end 48 of the notched portion 44 through an angle of substantially 120° will permit rotation of the shaft 32 relative to the sleeve for a period of about 0.2 second, which is sufficient time to allow for the glass sheet to be lifted by the lower mold member 12. During the initial phase of this time interval, the frictional force between the surface of the glass sheet 26 and the outer sleeve 33 of the roll causes said sleeve to stop with the glass sheet against the torsional resistance of spring 38 while the shaft 32 continues to rotate until the sleeve is relieved of the glass sheet.

It is preferable that the sheet be lifted while the pin 45 is moved an angular distance of approximately 60° to 80° from the end 48. When each roll 13 is unloaded, the torque of the spring 38 rotates the sleeve 33 in a reverse direction relative to the shaft 32 until the pin 45 re-engages the end 48 of the cut-away sector.

As each sheet 26 is lifted from the rolls 13, the locator stops 28 are lowered to a point below the level of the top surfaces of rolls 13.

After the glass sheet 26 has been pressed between mold members 11 and 12 and returned to the rolls 13 by lowering of the lower mold member 12, it is immediately transferred from the bending apparatus upon rolls 27' to a suitable annealing or tempering area, whereupon the stops 28 are again raised to position another sheet as it enters the bending apparatus.

It is to be understood that the form of the invention herewith shown and described is to be taken as an illustrative embodiment only of the same and that various changes in the shape, size and arrangement of parts may be resorted to without departing from the spirit of the invention.

I claim:

1. In apparatus for the horizontal bending of glass sheets, a bending mold having a ring-type bending member with an upward-facing shaping surface formed thereon, a plurality of conveyor rolls mounted for rotation within said ring-type bending member for supporting said glass sheet above said shaping surface in position to be bent thereby, and means for moving said bending member upwardly to lift said sheet from said conveyor rolls and bend the same into conformity with said shaping surface and downwardly to return the bent sheet to said conveyor rolls; the improvement which consists in that each of said conveyor rolls comprises an inner driven shaft and an outer load supporting sleeve rotatable on said shaft, and a resilient element fixed to said shaft and said sleeve and coupling the same together for simultaneous rotary movement when a sheet is freely movable over said sleeve and for a limited degree of relative rotary movement when a sheet is stopped on said sleeve.

2. The improvement according to claim 1, including a covering of a soft, non-abrasive, resilient material for the load supporting sleeve.

3. The improvement according to claim 1, in which said resilient element comprises a torsion spring connected at one end to said shaft and at its opposite end to said sleeve.

References Cited

UNITED STATES PATENTS

| 3,285,391 | 11/1966 | Fix | 198—127 |
| 3,317,303 | 5/1967 | Shorr | 65—374 X |
| 3,421,875 | 1/1969 | Kirkman | 65—275 X |

ARTHUR D. KELLOGG, Primary Examiner

U.S. Cl. X.R.

65—273, 275, 317; 198—127